US00RE45330E

(19) United States
(12) Reissued Patent
Kempf

(10) Patent Number: US RE45,330 E
(45) Date of Reissued Patent: Jan. 13, 2015

(54) ARCHERY QUIVER ATTACHMENT

(71) Applicant: James J. Kempf, Coralville, IA (US)

(72) Inventor: James J. Kempf, Coralville, IA (US)

(21) Appl. No.: 14/144,926

(22) Filed: Dec. 31, 2013

Related U.S. Patent Documents

Reissue of:
(64) Patent No.: 8,505,527
Issued: Aug. 13, 2013
Appl. No.: 12/951,552
Filed: Nov. 22, 2010

(51) Int. Cl.
*F41B 5/06* (2006.01)

(52) U.S. Cl.
USPC ..... 124/86

(58) Field of Classification Search
USPC ..... 248/229.14, 74.2, 229.16, 229.13, 248/229.12, 229.26; 124/25.6, 29, 86–88; 24/170, 59, 66.8
See application file for complete search history.

(56) References Cited

U.S. PATENT DOCUMENTS

| | | | | |
|---|---|---|---|---|
| 2,905,218 A | | 9/1959 | Smith et al. | 206/315.11 |
| 3,777,734 A | | 12/1973 | Rose | 124/25.5 |
| 4,252,101 A | | 2/1981 | Spitzke | 124/45 |
| 4,635,611 A | | 1/1987 | Priebe | 124/25.7 |
| 4,929,973 A | * | 5/1990 | Nakatani | 248/177.1 |
| 4,995,372 A | * | 2/1991 | Topel | 124/25.5 |
| 5,190,022 A | | 3/1993 | Larson | 124/25.7 |
| 6,328,189 B1 | | 12/2001 | Norden | 224/197 |
| 6,371,424 B1 | | 4/2002 | Shaw | 248/222.12 |
| 6,568,382 B2 | | 5/2003 | Martin et al. | 124/86 |
| 6,672,299 B2 | * | 1/2004 | Proctor | 124/86 |
| 7,464,908 B2 | | 12/2008 | Files | 248/229.16 |
| 7,770,859 B2 | | 8/2010 | Costabel et al. | 248/316.5 |
| 7,775,201 B2 | | 8/2010 | Cooper | 124/86 |

* cited by examiner

*Primary Examiner* — Gene Kim
*Assistant Examiner* — Amir Klayman
(74) *Attorney, Agent, or Firm* — Gerald E. Helget; Nelson R. Capes; Briggs and Morgan, P.A.

(57) ABSTRACT

A quiver for holding arrows is one-hand releasably attachable to an archery bow. A quiver attachment bracket having opposing grooves is mountable to the bow. The quiver has two parallel elongated struts supporting an arrowhead hood and at least one arrow shaft holder. A clamp is mounted to and between the struts having biased first and second jaws extending transversely of the quiver with each jaw having an adjacent one-hand grippable handle extending transversely of the quiver opposite of the jaws. The biased jaws each have a tongue that is lockable into one of the grooves.

7 Claims, 4 Drawing Sheets

ARCHERY QUIVER ATTACHMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This Application claims the benefit of Provisional Application Ser. No. 61/281,820 entitled IMPROVED DETACHMENT AND ATTACHMENT MEANS: ARCHERY QUIVER, filed Nov. 23, 2009.

BACKGROUND OF THE INVENTION

This invention relates to archery bows, (including crossbows) and more particularly, to a one-handed quick release quiver attachable to the riser of the archery bow.

In the shooting sport of archery and in archery hunting it is common practice to mount the arrows to be shot by the archery bow in a quiver that can be handled as a single unit versus individually handling a group of arrows.

U.S. Pat. No. 5,190,022 is an example of an archery arrow quiver that securely holds seven arrows together to be handled as a unit. The quiver may be permanently mounted to the archery bow. Alternatively, U.S. Pat. No. 2,905,218 shows that the archery quiver may be secured to the archer's belt or to a leather strap that is worn above the shoulder of the archer as shown in U.S. Pat. No. 6,328,189. In hunting, it is most advantageous to have the quiver releasably mounted to the riser of the archery bow so that the archer may quickly grab a second arrow from the quiver for a second shot during the hunt as opposed to fumbling with loose arrows or trying to reach for arrows from a quiver remotely mounted away from the bow. U.S. Pat. Nos. 4,252,101 and 6,568,382 show examples of mechanical releasable linkages of quivers to the riser section of the bow. However, these styles of quivers can fall away from, and off of, the bow should they be bumped while the archer is in the woods with many branches and thick brush around. This causes unnecessary noise while hunting and anxiety to the archer when his quiver accidently detaches from the bow.

A more modern quiver and archery bow arrangement includes a mechanical or friction fit with perhaps a tongue on a bracket on the quiver and a plate with a groove suitably mounted to the archery bow riser which will permit the interlocking of the archery bow and quiver. Most of these quivers include some kind of a mechanical lock such as camover levers or biased prongs that do not permit the quiver to readily separate from the archery bow. Examples of these types of quivers are shown in U.S. Pat. Nos. 3,777,734, 4,635,611, 6,371,424, 7,464,908 and 7,775,201.

The problem with this mechanical interference is that locking of these quivers requires one hand to move the release lever and the other hand to hold the quiver so that it does not fall away from the archery bow upon its release. This activity requires additional concentration by the archer in his two-hand removal of the archery quiver from the bow while being adept so as to not drop the bow or the quiver as it is released from the mounting bracket on the archery bow riser.

There is a need for an archery bow quiver that may be gripped with one hand and released from the archery bow riser without the use of the second hand which typically is supporting the archery bow at the grip. Such a quiver should also be attachable to other objects at a convenient location adjacent the archer for quick and ready access to additional arrows upon need.

SUMMARY OF THE INVENTION

A quiver for holding arrows is one-hand releasably attachable to an archery bow. A quiver attachment bracket having opposing grooves is mountable to the bow. The quiver has two parallel elongated struts supporting an arrowhead hood and at least one arrow shaft holder. A clamp is mounted to and between the struts having biased first and second jaws extending transversely of the quiver with each jaw having an adjacent one-hand grippable handle extending transversely of the quiver opposite of the jaws. The biased jaws each have a tongue that is lockable into one of the grooves.

A principal object and advantage of the present quiver invention is that it can be one-handedly removed and attached to a bow or an environmental object near the archery.

Another object and advantage is that the quiver is quickly and securely attaches to the bow.

DETAILED SPECIFICATION

Figure 1:
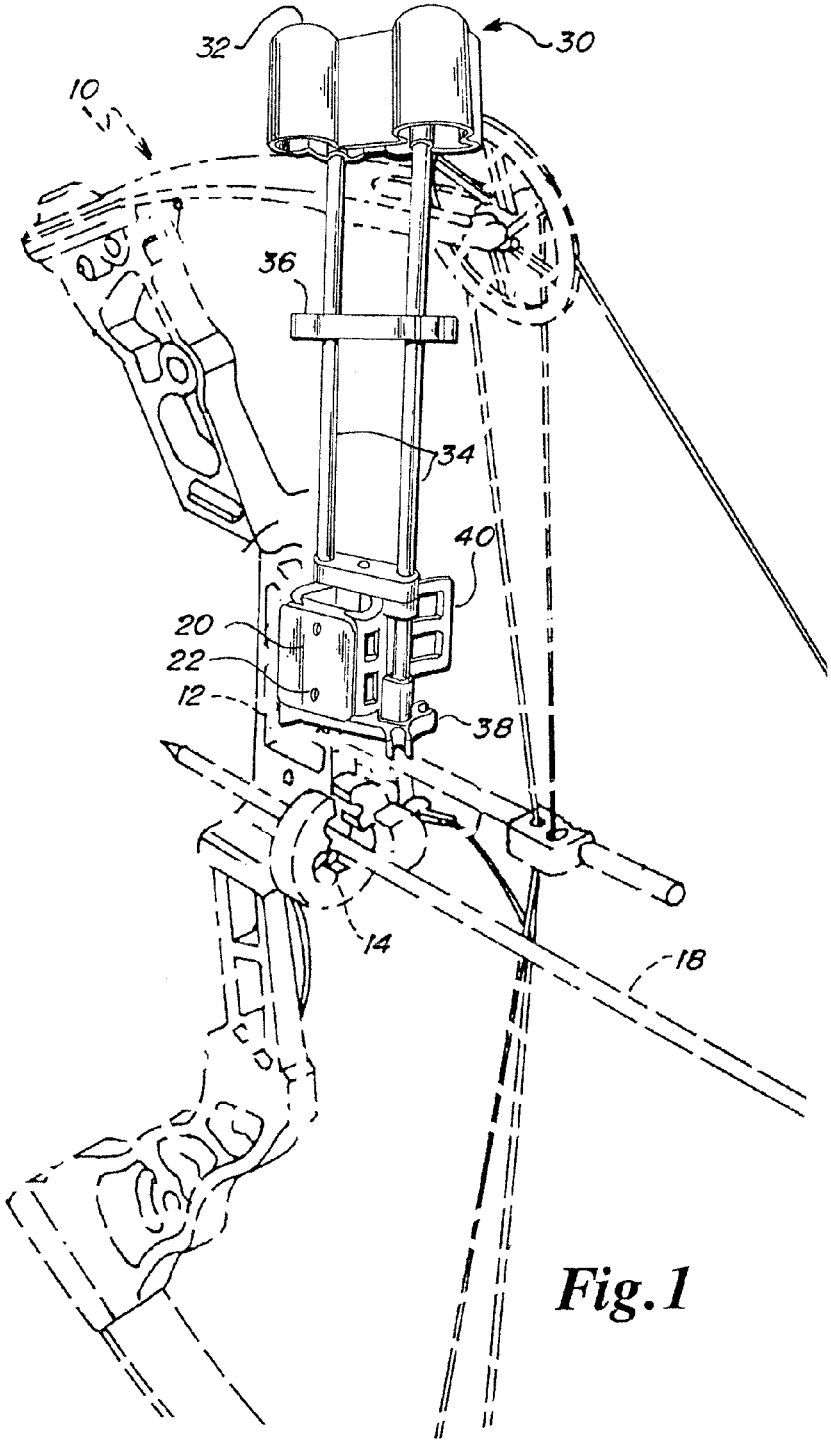
FIG. 1 is a perspective view of the archery quiver of the present invention attached to a bow launching an arrow shown in phantom outline.
Figure 2:
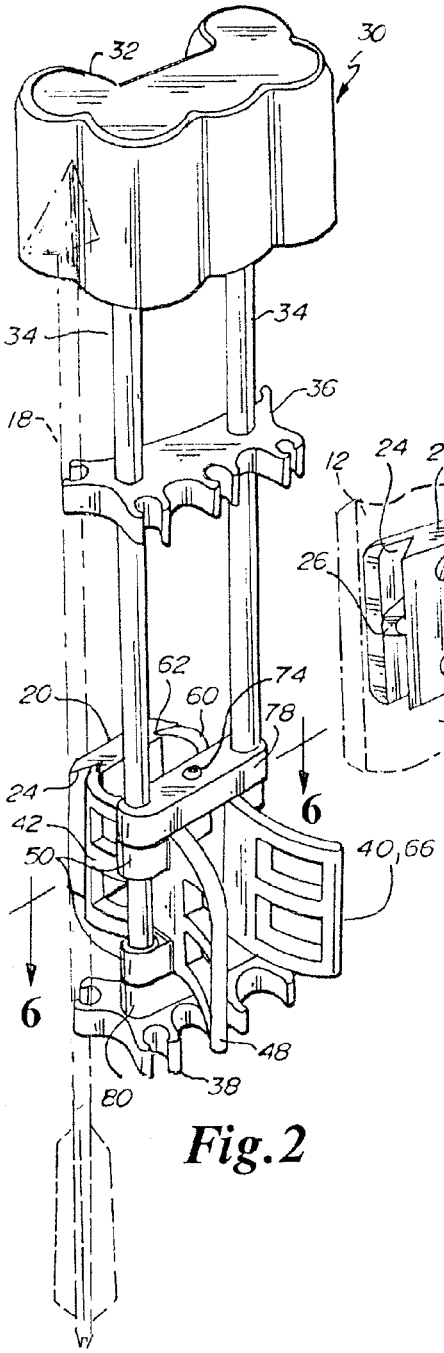
FIG. 2 is a perspective view of the opposite side of the quiver from FIG. 1 with the quiver containing one arrow and secured to the quiver attachment bracket which is secured to the archery bow of FIG. 1.
Figure 3:
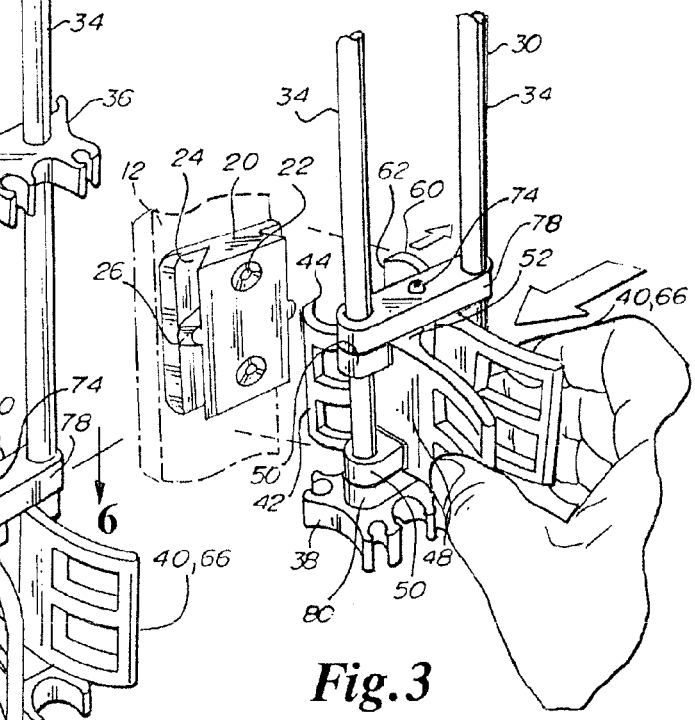
FIG. 3 is a perspective broken away view similar to FIG. 2 showing the quiver attachment clamp with handles squeezed about to engage the quiver attachment bracket mounted to the riser 12 of the archery bow shown in phantom outline.
Figure 4:
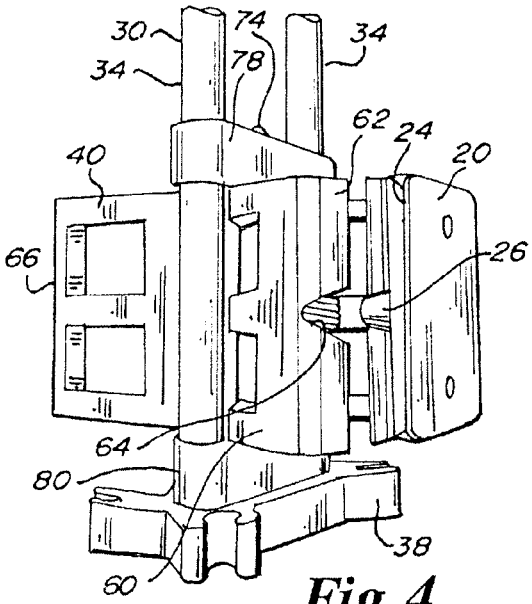
FIG. 4 is a right-side elevational view of the quiver broken away showing the jaws about to be engaged with the grooves of the quiver attachment bracket clearly showing the index knob and notch indexing for a secure arrangement.
Figure 5:
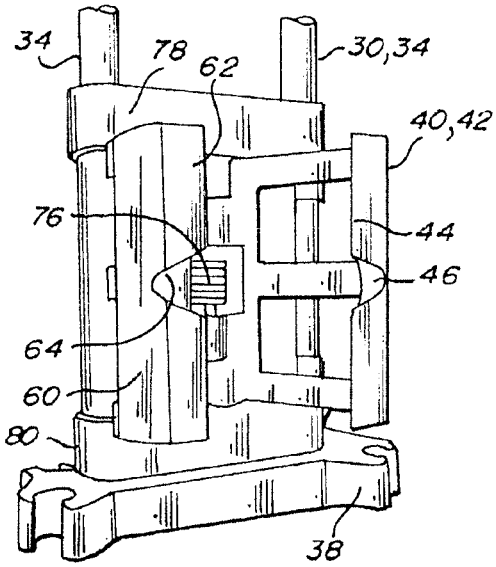
FIG. 5 is a broken away elevational view of the quiver attachment clamp with the jaws opened clearly showing the hinges and biasing spring.

Referring to FIGS. 1 and 2, the archery quiver 30 of the present invention may be understood in the context of an archery bow 10. Bow 10 includes a middle riser section 12 where attachments to the bow 10 are typically mounted. On the shelf side of the riser 12 is typically mounted an arrow rest

14 which supports an arrow 18 as it is drawn and shot from the archery bow 10. Archery bow 10 also includes crossbows as are well known.

On the opposite side of the riser 12 from the arrow rest 14 is the quiver attachment bracket 20 which secures to the riser 12 suitably by screws passing through apertures 22 and into standard mounting threaded apertures typically present on compound archery bows 10. The quiver attachment bracket 20 has opposing and outwardly facing grooves 24 with centrally located index knobs 26 in each groove 24 for indexing of the quiver attachment clamp 40 as will be appreciated below.

Quiver 30 includes a hood 32 at the top end supported by two parallel struts or rods 34. Intermediately of rods 34 is located a top elastomeric arrow holder 36 with a bottom arrow holder 38 located below the quiver attachment clamp 40.

Referring to FIGS. 3 through 8, the quiver attachment clamp 40 will now be appreciated. The clamp 40 has a first jaw 42 with a sharp tongue 44 that will index into bracket groove 24. A notch 46 is located on tongue 44 to index with the index knob 26 to securely and accurately locate the attachment clamp properly on the quiver attachment bracket 20. While the first jaw 42 extends rearwardly, handle 48 extends forwardly for ready access by the archer. Handle 48 is suitably, but not necessarily, immovable as it is anchored with ear 50 which is secured about strut 34. Intermediately located are pivot ears 52 which define hinges 54.

The second jaw 60 extending rearwardly similarly has a sharp tongue 62 with a notch 64 for securely indexing with the opposite groove 24 and indexing knob 26. Also extending forwardly is handle 66 which is generally adjacent handle 48 for easy gripping and squeezing. Second jaw 60 also suitably has pivot ears 66 which define hinges 70. Complimentary hinge parts 54 and 70 are secured together by way of pivot pin 74 which also biases the jaws 42 and 60 by way of coil spring 76. The attachment clamp 40 is securely located on struts 34 by top and bottom cross members 78 and 80.

In operation, the archer holds the bow 10 with one hand. The quiver 30 is not on bow 10. Arrows 18 with their tips protected within hood 32 are secured within quiver 30 as the shafts of the arrows 18 are secured in top and bottom elastomeric arrow holders 34 and 38. The archer simply grasps the handles 48 and 66 of the quiver 50 with the other hand and squeezes. By this action, jaws 42 and 60 separate as the clamp is brought onto the attachment bracket so that tongues 44 and 62 index into grooves 24 and notches 46 and 64 secure about index knobs 26 to lock the quiver 30 onto the quiver attachment bracket 20. The quiver is now securely fixed to the archery bow 10.

Figure 6:
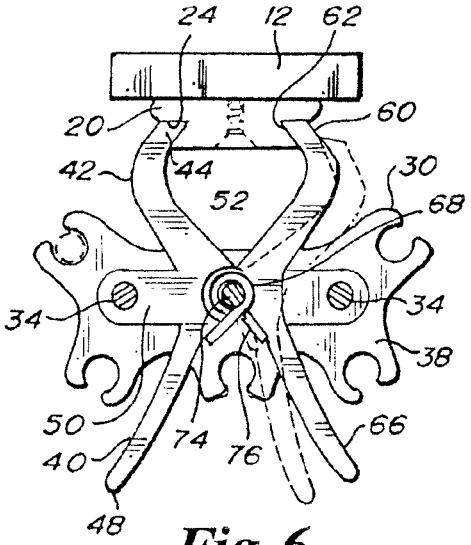
FIG. 6 is a top plan view taken along lines 6-6 of FIG. 2 showing the quiver attachment clamp secured to the attachment bracket mounted to the riser of the bow with the quiver detachment step of squeezing the handles shown in phantom outline.
Figure 7:
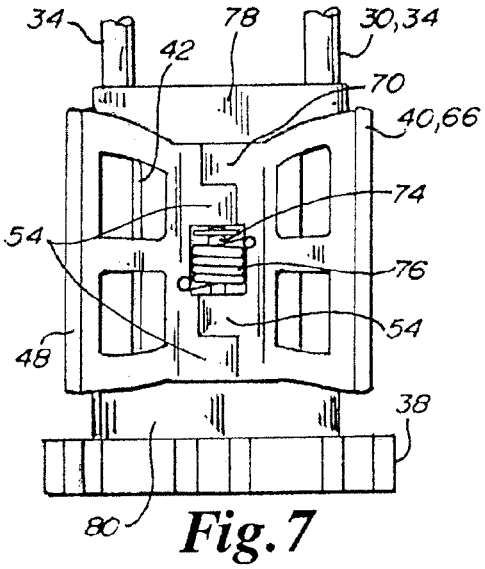
FIG. 7 is a front elevational view partially broken away of the handles of the quiver attachment clamp showing the hinges, pin and spring.
Figure 8:
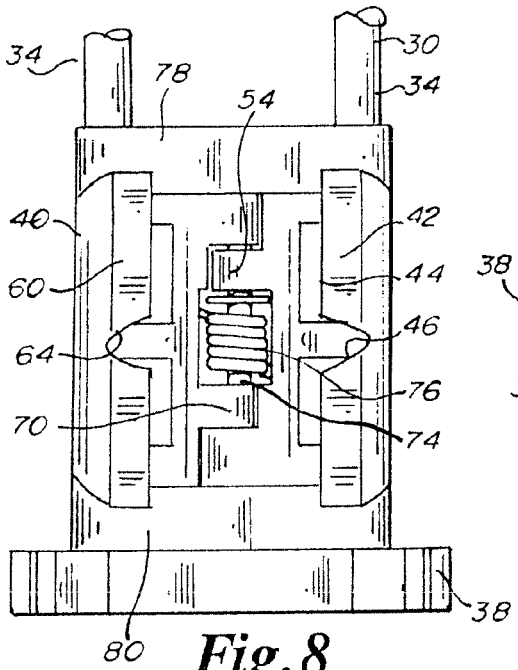
FIG. 8 is a rear elevational view partially broken away showing the jaws of the quiver attachment clamp, hinges and biasing spring.

To release the quiver 30 from the archery bow 10, the archer simply squeezes handles 48 and 66 to release the jaws 42 and 60 from the grooves 24 of the attachment bracket as the quiver 30 is moved away from the archery bow 10. The quiver 30 then may be secured to a tree branch or a portion of a tree stand in close proximity to the archer for ready access to the arrows 18 when it is desired that the quiver 30 not be attached to the archery bow 10. FIG. 6 shows that jaw 48 is immovable and secured by way of its anchor 50 about strut 34. By this arrangement, squeezing the handles 48 and 66 move the second jaw handle 66 for release and attachment of the clamp 40 to the bracket 20.

Figure 9:
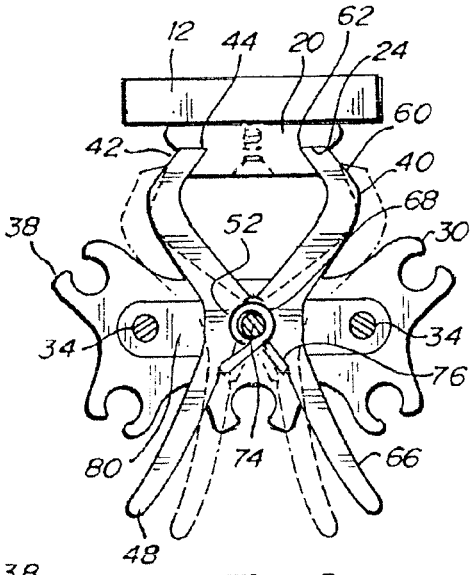
FIG. 9 is similar to the cross section of FIG. 6 wherein both the jaws of the clamp are movable.

FIG. 9 shows an alternative embodiment where the first and second jaws 42 and 60 are both free floating and neither of which are secured to struts 34 to permit both handles 48 and 66 to move in attaching and releasing the clamp 40 of quiver 30 to the quiver attachment bracket 20 mounted upon the archery bow 10.

While certain embodiments and details have been included herein and in the attached invention figures for purposes of illustrating the invention, it will be apparent to those skilled in the art that various changes in the apparatus disclosed herein may be made without departing from the scope of the invention which is defined in the appended claims.

What is claimed is:

1. A quiver for holding arrows that is one-handed releasably attachable to an archery bow, comprising:

a) a quiver attachment bracket mountable to the bow having opposing grooves facing outwardly from each other;

b) [two parallel] *at least one* elongate [struts] *strut* supporting a hood and at least one arrow holder; and c) a quiver attachment clamp mounted to [and between] the [struts] *strut* having biased closed first and second jaws on a single pivot pin extending transversely rearwardly of the quiver with each jaw having a one-handed grippable handle extending transversely forwardly of the quiver for ready hand access opposite of the jaws each jaw with a tongue that is brought into and lockable into one of the grooves upon squeezing and releasing of the handles with one hand.

2. The quiver of claim 1, wherein the grooves each have an index knob and each of the jaws have an index notch to mate with the corresponding knob for a positive lock of the clamp and quiver to the attachment bracket.

3. The quiver of claim 1, further comprising a second arrow holder wherein the arrow holders are elastomer and mounted to the [struts] *strut*.

4. The quiver of claim 1, further comprising an arrow tip hood mounted to a top end of the [struts] *strut*.

5. A quiver for holding arrows that is one-handed releasably attachable to an archery bow, comprising:

a) a quiver attachment bracket mountable to the bow having opposing grooves facing outwardly;

b) [two parallel] *at least one* elongate [struts] *strut* supporting a hood and at least one arrow holder;

c) an arrow tip hood mounted to a top end of the [struts] *strut*; and d) a quiver attachment clamp mounted to [and between] the [struts] *strut* having biased *closed* first and second jaws on a single pivot pin with a coil spring extending transversely rearwardly of the quiver with each jaw having a one-handed grippable handle extending transversely forwardly of the quiver for ready hand access opposite of the jaws each jaw with a tongue that is brought into and lockable into one of the grooves upon squeezing of the handles with one hand.

6. The quiver of claim 5, wherein the grooves each have an index knob and each of the jaws have an index notch to mate with the corresponding knob for a positive lock of the clamp and quiver to the attachment bracket.

7. A quiver for holding arrows that is one-handed releasably attachable to an archery bow, comprising:

a) quiver attachment bracket mountable to the bow having opposing grooves facing outwardly from each other;

b) [two parallel] *at least one* elongate [struts] *strut* supporting a hood and an elastomeric arrow [holders] *holder*;

c) an arrow tip hood mounted to a top end of the [struts] *strut*; and d) a quiver attachment clamp mounted to [and between] the [struts] *strut* having biased closed first and second jaws on a single pivot with a coil spring extending transversely rearwardly of the quiver with each jaw having a one-handed grippable handle extending transversely forwardly of the quiver for ready hand access opposite of the jaws each jaw with a tongue that is brought into and lockable into one of the grooves upon squeezing and release of the handles with one hand wherein the grooves each have an index knob and each of the jaws have an index notch to mate with the corresponding knob for a positive lock of the clamp and quiver to the attachment bracket.

* * * * *